United States Patent [19]

Orsak et al.

[11] Patent Number: 4,555,438
[45] Date of Patent: Nov. 26, 1985

[54] FRAGRANT WALL COVERING HAVING AN EMOLLIENT MOISTURIZER AND A METHOD OF MAKING SAME

[75] Inventors: John E. Orsak, Sparta, N.J.; Charles A. Roman, Conyngham, Pa.

[73] Assignee: Dayco Corporation, Dayton, Ohio

[21] Appl. No.: 711,690

[22] Filed: Mar. 14, 1985

[51] Int. Cl.⁴ .............................. B32B 9/04
[52] U.S. Cl. .............................. 428/219; 156/244.11; 156/244.16; 428/340; 428/411.1; 428/497; 428/522; 428/904.4; 428/905
[58] Field of Search ............... 428/904.4, 905, 219, 428/340, 411.1, 497, 522; 156/244.16, 244.11

[56] References Cited

U.S. PATENT DOCUMENTS 4,196,244  4/1980  Roman ........................ 428/159
4,219,376  8/1980  Roman ........................ 156/209

FOREIGN PATENT DOCUMENTS 1168157  5/1984  Canada .

OTHER PUBLICATIONS

Copending Patent Application, Ser. No. 563,010, filed Dec. 19, 1983, (Dayco Corp. Docket No. 82-48a), of Richard W. Cole.

Primary Examiner—Marion C. McCamish
Attorney, Agent, or Firm—Tassone, Joseph V.; David E. Wheeler

[57] ABSTRACT

The following invention provides a fragrant wall covering having a polymer entrapped emollient-moisturizer composition incorporated therein. Since the emollient-moisturizer composition is incorporated into a dry blend of the polymeric material which is used to make the wall covering, the emollient-moisturizer composition is distributed substantially evenly throughout the polymer of the wall covering. In the illustrated embodiment of the invention, the emollient-moisturizer composition comprises a volatilizable material having a strong, recognizable odor. Because of its even distribution in the polymer of the wall covering, the volatilizable material is released gradually into the atmosphere, and the wall covering retains said recognizable odor for a substantial period of time. A method of making the wall covering of the invention is provided in which the polymer used to make the wall covering is extruded, the density of the polymer is measured as it is extruded, and the data obtained by measuring the density of the polymer is fed into a computer which controls the thickness of the extruded material and the speed of calendering rollers on which the material is extruded, in order to provide a layer of material having substantially uniform thickness.

27 Claims, 5 Drawing Figures

FRAGRANT WALL COVERING HAVING AN EMOLLIENT MOISTURIZER AND A METHOD OF MAKING SAME

BACKGROUND OF THE INVENTION

1. Field of the Invention

The present invention relates to a fragrant wall covering having an emollient-moisturizer composition incorporated therein, and a method for making the same.

2. Prior Art Statement

Wall covering, especially laminated wall covering is conventionally made by pressing together a strip of scrim material and a strip of polymeric material to form a laminated substrate. The substrate is coated with, for example, a liquid vinyl plastisol by a roller which passes through a reservoir containing the plastisol, and deposits the plastisol on the substrate. The laminate structure is then subjected to embossing, heating (if a blowing step to create voids, or a vulcanizing step is required), collecting on a roll, and any additional steps required depending upon the type of wall covering which is desired. Such a process is described in U.S. Pat. No. 4,196,244, issued to Charles A. Roman on Apr. 1, 1980. A similar method is described in U.S. Pat. No. 4,219,376, which issued to Charles A. Roman on Aug. 26, 1980.

Conventional methods for the making of polymeric wall coverings have the disadvantage that the temperature and viscosity of a liquid coating material, such as a vinyl plastisol, must be closely controlled to provide a coating having a substantially uniform thickness. Also, the various materials used to form the substrate, laminate, and the liquid coating materials, require a significant amount of handling which must be accounted for in the cost of the final product.

It is known in the art to extrude a polymeric material onto a substrate to produce products, such as vinyl seat covers, which have a thickness in the range of 16 to 20 mils. The prior art methods of extruding a polymeric material onto a substrate have generally been used to produce products having a substantial thickness, in the range of 20 mils, since extrusion methods are susceptible to forming products having pinholes. Pinholes are formed in a layer of extruded material when moisture inadvertently becomes trapped in the polymer prior to extrusion. When moisture becomes trapped in the polymer material, the high temperature of the extrusion process causes the moisture to vaporize as the polymer is heated, and the vaporized moisture escapes through the die head, and holes are formed in the material as it is extruded. Also, since the extrusion method is ordinarily used in conjunction with calendering or embossing, to smooth and flatten the extruded material, the problem of pinholing can be further exaggerated when an insufficient amount of polymeric material is extruded relative to the speed of the calendering rollers, since pinholes are formed when the polymeric extruded layer is stretched and pulled by the calendering rollers. This problem is partially controlled by the prior art in the rubber industry using a vented extruder.

It is known in the art to provide a rubber product having a reodorant incorporated therein such as in copending U.S. application Ser. No. 563,010. In the copending application, the cover of a hose of the invention is made having voids therein, in which a reodorant material is entrapped during the formation of the hose cover. The reodorant which is incorporated in the hose cover is incorporated in the polymeric material which is subsequently used to make the hose cover.

An emollient-moisturizer composition comprising about 5 to about 95 weight percent of the cross linked polymer matrix and from about 95 to about 5 weight percent of an emollient-moisturizer is disclosed in Canadian Pat. No. 1,168,157. The emollient-moisturizer composition of the patent is described as being useful for incorporation in wax used in anti perspirants, deodorants, lipsticks, sun screens, insect repellants, colognes and soaps.

SUMMARY OF THE INVENTION

In accordance with the present invention, there is provided a wall covering having a polymeric exterior decorative surface layer and an exposed surface defining an inside surface of the wall covering. The improvement comprises a fragrant polymer entrapped emollient-moisturizer composition incorporated substantially uniformly in the polymeric layer. The fragrant polymer entrapped emollient moisturizer composition is gradually released into the atmosphere over an extended period of time.

The present invention also provides a laminated wall covering comprising a polymeric exterior decorated surface layer and a substrate having an exposed surface defining an inside surface of said wall covering. The improvement in the wall covering comprises a fragrant polymer entrapped emollient-moisturizer composition incorporated substantially uniformly in the polymeric layer. The fragrant entrapped emollient-moisturizer composition is gradually released into the atmosphere over an extended period of time.

Also provided is a method of making a polymeric wall covering including the steps of incorporating a fragrant polymer entrapped emollient-moisturizer composition in the polymer of the wall covering. The method also includes the step of forming the polymeric layer of the wall covering by extrusion.

The invention also provides a method of extruding and calendering a layer of polymeric material having a substantially uniform thickness wherein the extruder head used in the extrusion of the polymeric material is disposed in spaced relation sufficiently above the collecting part of the apparatus such that gravity is used to partially spread and stretch the polymer as it exits the extruder head. In the illustrated embodiment, calendering rollers are used to collect the extruded material so that the extruded material can immediately be smoothed and flattened, or embossed, as desired. The density of the extruded material is measured after it is calendered and/or embossed as it is extruded. The data obtained by measuring the density of the extruded material is fed into a computer, and the data so obtained is used by the computer to control the speed of the calendering rollers and/or the tightness of the orifice of the extruder head according to a predetenmined formula which has been programmed into the computer. Controlling the speed of the calendering rollers, and/or the tightness of the extruder head makes it possible to control the thickness of the extruded material within close tolerances.

Other aspects, embodiments, objects and advantages of this invention will become apparent from the following specification, claims and drawings.

BRIEF DESCRIPTION OF THE DRAWINGS

The accompanying drawings illustrate a present preferred embodiment of the invention, in which.

DESCRIPTION OF THE PREFERRED EMBODIMENTS

Figure 1:
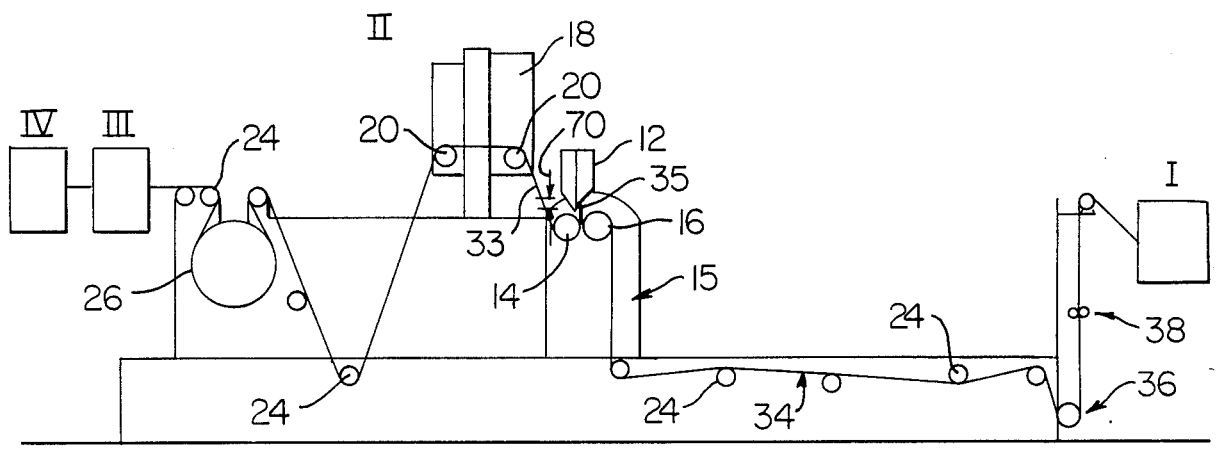
FIG. 1 is a side view illustrating the apparatus used in the method of the invention.

In an exemplary embodiment of the invention, the polymeric material of the wall covering of the invention may be a flexible vinyl. The polymeric material of the wall covering has a polymer entrapped emollient-moisturizer composition incorporated therein. The emollient-moisturizer composition of the invention comprises a volatilizable material having a strong recognizable odor.

As an example of a formula for such a flexible vinyl, the following is provided:

|  | 100 parts polyvinyl chloride resin |
|---|---|
|  | 29 parts dioctyl phthalate |
|  | 5 parts epoxidized soy bean oil |
|  | 2 parts barium-cadmium-zinc stabilizer |
|  | 2 parts mildew inhibitor |
|  | 20 parts calcium carbonate |
|  | 20 parts pigment color paste |
|  | 10 parts fragrance |
| Total | 188 parts |

As fragrances, which may be conveniently incorporated into the formula in the form of a polymer entrapped emollient-moisturizer composition of the kind described in Canadian Pat. No. 1,168,157, there may be provided cedar oil (natural cedar oil is preferred), baby powder, florals (such as lilac and rose), leathers, fruits (such as orange, grape, cherry, lemon, lime and banana) or special fragrances such as sea mist, etc. Polymer entrapped emollient-moisturizer compositions which are used to provide the fragrance of the wall covering of the invention may be obtained from Naarden International U.S.A., Inc., 919 3rd Avenue, New York, NY 10022.

Making the wall covering of the invention by incorporating a fragrance, which gives the wall covering a distinctive odor, directly into a dry blend of the polymeric formulation which is subsequently used to make the wall covering, provides the advantages that the fragrance is long lasting (because the fragrant emollient-moisturizer composition is gradually released into the atmosphere over an extended period of time since it is distributed substantially evenly throughout the polymer), and it cannot be washed off. Since the fragrance is conveniently incorporated into a polymer, and the polymer containing the fragrance is incorporated in a dry blend of the polymer used to make the wall covering, separate formulations for the fragrance, and separate method steps for the impregnation of the polymer with the fragrance, are not required.

The wall covering of the invention may be provided as an extruded layer of polymeric material, or as a laminate. A laminated wall covering may be provided by depositing an extruded layer of polymeric material onto a substrate by extrusion or by knife or roll coating a latex composition onto a substrate.

In its simplest form, laminated wall covering may comprise a substrate or scrim material coated with one layer of polymer. Additional layers of polymer may be used depending on the specifications of the wall covering required. Additional layers of polymer may be applied as described herein or by other means well known in the art.

In a laminated wall covering in which a polymer is melt extruded onto a substrate, the polymer will be bonded to the substrate when melted polymer surrounds and/or impregnates the fibers of the substrate.

In the wall covering of the invention, it is preferred that the polymeric layers have incorporated therein about 5 to 12% fragrance by weight. The amount of fragrance used may vary depending on the strength of the scent which is required for a specific wall covering. The wall covering of the invention will have optimum weight and flexibility, and other optimum handling properties, when it has a thickness in the range of about 5 to 9 mils. In the wall covering of the illustrated embodiment, it is preferred that the thickness be about 6 to 7 mils. It will be apparent to those skilled in the art, that in a polymer having such a small thickness, that it is important that the gauge of the polymer layer be substantially constant within very small tolerances. If the gauge of the polymer is maintained constant, the problems of pinholing, encountered in the prior art, especially with regard to extrusion processes, can be avoided.

Reference is now made to FIG. 1 of the drawings which illustrates an exemplary embodiment of the essential parts of apparatus used to produce the wall covering of the present invention by extrusion. The apparatus comprises an unwinding section generally represented by Roman numeral I, an extruding section generally represented by Roman numeral II, a trimming section generally represented by Roman numeral III and a winding section generally represented by Roman numeral IV. In those applications, as described below, in which a laminated wall covering is made, the unwinding section is used, as is conventional in the art, to unwind, stretch, sweep and otherwise prepare the substrate to receive the extruded polymeric material Extruding section II is used to extrude a polymeric material, optionally onto a substrate, and to cool the polymeric material to prevent stretching or necking down of the polymer as it continues through the apparatus of the invention. Trimming section III is used for cutting away the edges of the substrate or scrim material, and cutting the polymeric material to size before it is collected. Winding section IV is used for collecting the wall covering, conventionally on a roller. In the illustrated embodiment, a substrate material 34 is provided on which polymer is extruded to form the laminated wall covering of the invention. It will be recognized by those skilled in the art that wall covering may be made by the apparatus of the invention without the use of a substrate, merely by omitting the use of substrate 34 in the apparatus.

In the illustrated embodiment of the invention, when laminated wall covering is made, substrate 34, comprising a woven material, or a webbed material; e.g. a scrim material having a density of about 1½ ounces per square yard, is driven in the apparatus by conventional means through pinch guiders 38, and is spread on Menzel spreader 36, and transmitted over conveying rollers 24 to rubber nip roller 16. Steel roller 14, which may be smooth, to act as a calendering roller to smooth and flatten the polymeric material as it is extruded; or may have a design etched, electroformed, or electroplated therein to serve as an embossing roller for creating a design in the polymeric material as it is extruded; is provided in a working relationship with rubber nip roller 16, such that when polymeric material is extruded from die 12 onto the substrate 34, the polymeric material and substrate are pressed between rubber nip roller 16 and steel roller 14. Rollers 14 and 16, together with their support structure, comprise embossing station 15.

Die 12 is in spaced relation above rollers 14 and 16 to use gravity to help spread and stretch the extruded layer before it is collected in the embossing station 15. The distance 70, which is the distance die 12 is above the nip of the rollers 14 and 16, permits flexibility in the thickness of the extruded layer since rollers 14 and 16 may be rotated faster or slower than the speed of the falling, extruded polymer 35, as desired, in order to provide a thinner or a thicker layer of extruded material, respectively, as desired. The extruder II, as described below, may have means for controlling the thickness of polymeric material layer 35 as it is extruded. In the case in which a substrate is used, the polymeric material together with the substrate form laminated wall covering material 33.

Figure 4:
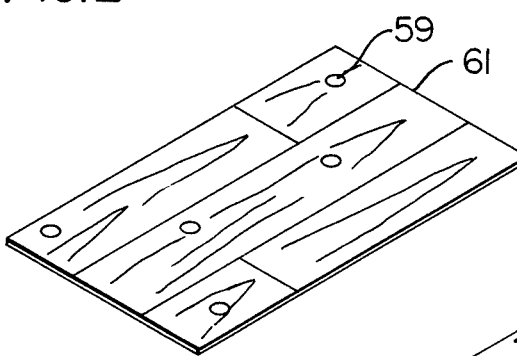
FIG. 4 illustrates smooth wall covering of the invention having a cedarwood design.
Figure 5:
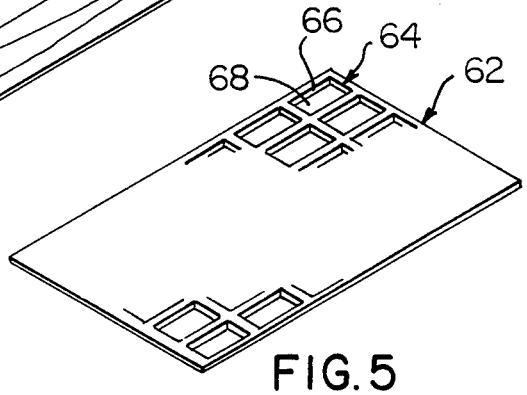
FIG. 5 illustrates embossed wall covering made according to the method of the invention.

An example of an embossed wall covering is illustrated in FIG. 5. When embossed wall covering 62, having a fragrant emollient composition incorporated therein is made, the greater surface area of wall covering 62, as represented by ridge 64, side surface 66 and bottom surface 68 of the embossed pattern, increases the amount and the rapidity of the release of the fragrant composition into the atmosphere, producing a stronger scent as compared to smooth wall covering. An example of a smooth wall covering is illustrated in FIG. 4.

As material 33 leaves the embossing nip or the calendering nip, it is transmitted into Beta gauge 18, over precooling driven rollers 20, to determine the density of the material. Pre-cooling driven rollers 20 serve to cool the extruded polymer and to maintain said polymer taut as its density is being measured by Beta gauge 18. Beta gauge 18 operates by scanning the polymeric layer of material to detect residual heat. The amount of heat retained by the material is directly related to its density. With proper calibration, the density of the polymeric material may be measured substantially instantaneously at any given spot. The polymeric material must be kept taut during the density measurement in Beta gauge 18 since any looseness or fluttering of the polymeric material will cause an erroneous reading.

Although, in the illustrated embodiment, the density of the material is measured using residual heat, it will be apparent to those skilled in the art that other suitable means, such as measuring light penetration, or B-radiation penetration of the material, may be used for measuring the density of the material.

The density of the laminate material is determined, and the data from the Beta gauge is transmitted to a computer, to be used by the computer for further controlling the extrusion of the method, as is described in more detail below. After leaving the Beta gauge 18, the laminate material is transmitted over roller 24 to cool can 26, which is used to cool the extruded polymeric material to prevent stretching or necking down of the polymer layer. After the material is trimmed and collected, the material on the roller is transmitted to a printing apparatus where a suitable design is printed thereon by conventional means.

Figure 2:
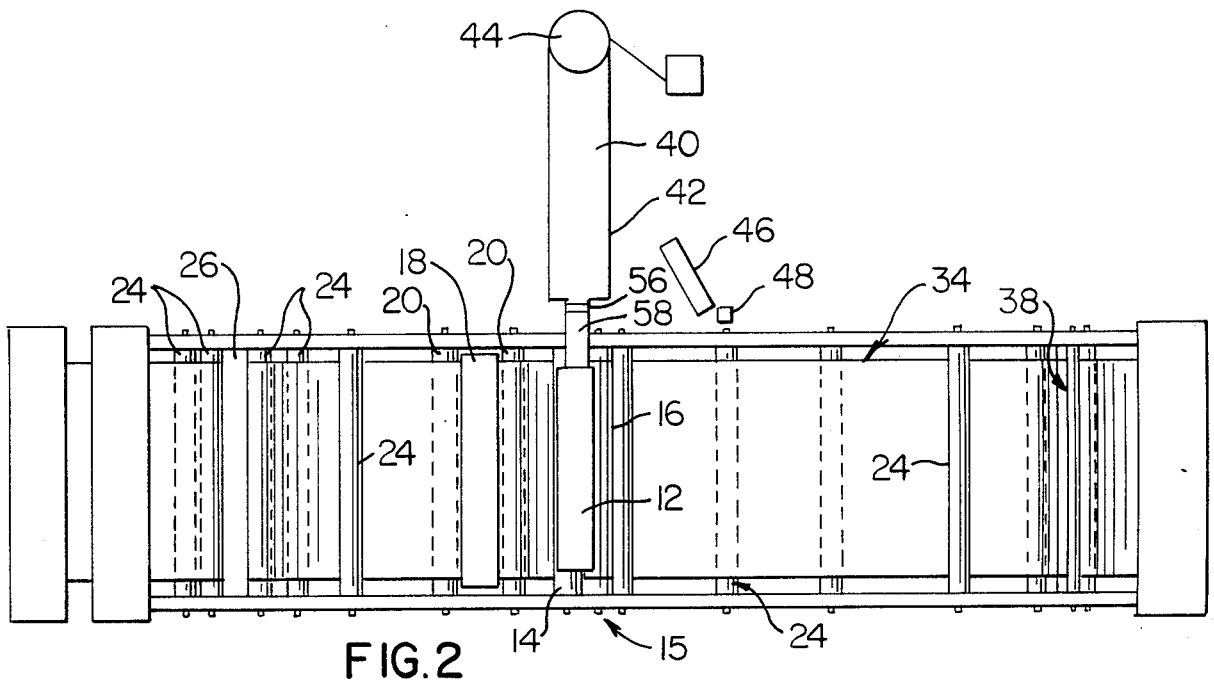
FIG. 2 is a top view illustrating the apparatus used in the method of the present invention.

Reference is now made to FIG. 2 which illustrates a top view of the apparatus used to make the wall covering of the invention. In the method of the invention, a dry blend of the polymeric material which is to be extruded is dumped into dry blend hopper 44. From dry blend hopper 44, the polymeric powder material is fed into the barrel and screw section 40 of the extruder In the illustrated embodiment, since a hot melt extrusion is preferred, heating sections 42 are provided on the barrel and screw section 40 to provide temperature control of the polymeric material as it is extruded. Heating sections 42 provide a heating gradient from the dryblend hopper, through the barrel, to the extruder die head. The heating section 42 closest to the dryblend hopper 44 may, for example, be set at a temperature of about 260° F. The heating section closest to adapter 58 may be set at a temperature of about 350° F. In addition to heat being provided by the heating stations, those skilled in the art will recognize that shear forces and frictional forces in the extruder will add to the temperature of the extruded polymer. When the polymer used in the extrusion is, for example, vinyl, the temperature of the vinyl extruded at the die head will be in the range of about 360°–380° F. This temperature is closely monitored by a number of thermocouples placed in the die-head. Control panel 46 is provided to display data from each of the heat panels 42, and to provide controls so that the operator can easily control the temperature at each section of the extrusion process, and to control the speed of the extrusion, and the thickness of the extruded layer, and adjust these parameters accordingly as needed.

The melted polymeric material is forced through the barrel of the extruder, by the action of the screw, through screen changer 56, through adapter 58, and into the die 12. Screen changer 56, which, for the purposes of the illustrated embodiment will be about 70 mesh, is used to filter out foreign material which may have fallen into the polymer composition during its preparation. Adapter 58 is provided in various lengths adapted to center the various sized extruder die heads, which may be used in the invention, relative to the nip roller 16.

As mentioned above, the density of extruded material is measured in Beta gauge 18. The data provided by the Beta gauge 18 is relayed to computer 48. Thus, in the production of a specific wall covering, where the desired density is about 8 ounces per square yard, for example, the density of the measured portion of the wall covering is relayed to the computer. The speed of rotation of rollers 14 and 16 may be controlled by the computer. If the density of the measured section is less than 8 ounces per square yard, the computer will process this data and will slow down the rotation of rollers 14 and 16 in embossing station 15 and/or will cause the orifice of the die to increase in size as is described below (see FIG. 3), to increase the density of the extruded layer.

Figure 3:
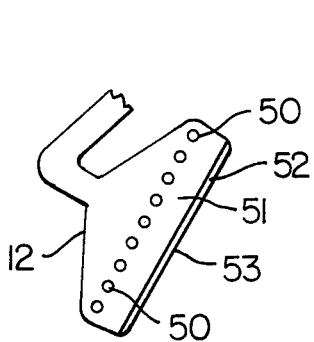
FIG. 3 illustrates an extruder head adapted for use in the method of the present invention.

Reference is now made to FIG. 3 which illustrates a perspective view of the die head 12 used in the apparatus of the invention. The die head 12 is made of essentially two distinct die halves 51 and 53 which are held in a specific relationship to one another by bolts 50. Polymeric material is extruded through orifice 52 of the assembled die head 12. The tightness of bolts 50 controls the size of orifice 52, which controls the thickness of the extruded polymeric layer. In one embodiment of the invention, bolts 50 may be integrally associated with servo mechanisms, which may be controlled by the computer and are used to automatically tighten or loosen said bolts 50 as it is desired to produce a thinner extrusion layer or thicker extrusion layer, respectively, as desired. By controlling the speed of the rollers and/or the size of the orifice of the extruder head, with reference to the measured density of the extruded material, the thickness of the extruded layer can be corrected substantially instantaneously when the thickness is detected to be too thin or too thick. Accordingly, the gauge of the extruded material can be closely controlled.

Reference is now made to FIG. 4 which illustrates the type of design which may be printed in the wall covering of the invention. FIG. 4 illustrates a cedar board pattern which will be particularly applicable to a wall covering which may have a polymer entrapped moisture-emollient composition which comprises cedar oil incorporated therein. The design illustrated shows individual boards 61 complete with knotholes 59.

In an alternative embodiment, wall covering according to the present invention may be made incorporating the fragrances recited above, in a polymer entrapped emollient-moisturizer composition in a latex composition, and by knife coating or roll coating the latex composition onto a substrate.

In the method of the invention, in which the latex composition, including the fragrance, is knife coated or roll coated onto a substrate; it is preferred that the latex composition be a PVC (polyvinylchloride) latex composition. The latex composition may be coated onto a substrate as is known in the art by Stork apparatus, available from Stork X-cel, P.O. Box 9-5830AA, Boxmeer, Holland. Such apparatus is distributed in the U.S.A. by Zima, Interstate 85 at Zima Park, P.O. Box 6010, Spartanburg, South Carolina 29304. In such a method, the substrate or scrim, having a density of about 1½ ounces per square yard, is stretched in a tenter frame and is top coated using a knife or roll coater.

An exemplary composition which may be used in the top coating of the invention is provided as follows:

| CEDAR LATEX TOPCOAT GRIND | LBS. | % |
| --- | --- | --- |
| Water | 3,495.0 | 13.9 |
| Tetrasodium Pyrophosphate | 25.0 | .1 |
| Calcium Carbonate | 5,729.0 | 22.9 |
| Titanium Dioxide Slurry | 3,034.0 | 12.1 |
| Cedar Fragrance P-0053 | 2,506.0 | 10.0 |
| 50% Colloid 60 Solution | 28.0 | .1 |
| 25% Surfonic N-120 Solution | 42.0 | .2 |
| Monoplex S-73 | 320.0 | 1.3 |
| | 15,179.0 | 60.6 |

The above represents part of the composition of the invention. The above blend is incorporated in the letdown (letdown refers to the aqueous solution used for spreading the latex on the substrate) latex composition as follows:

| LETDOWN | LBS. | % |
| --- | --- | --- |
| Topcoat Grind | 15,179.0 | 60.6 |
| Water | 1,993.0 | 8.0 |
| Geon Latex | 6,769.0 | 27.0 |
| 50% Acrysol G. S. Solution | 1,121.0 | 4.4 |
| | 25,062.0 | 100.0 |

After the first coating, the substrate is passed through an oven to drive off the solvents and stabilize the latex composition. The dried substrate, with one coat of latex, is routed through the apparatus so that the substrate is turned bottom side up and is then subjected to a similar top coating with a second latex composition.

An exemplary composition which may be used in the bottom coating (undercoating) of the invention follows:

| CEDAR LATEX UNDERCOAT GRIND | LBS. | % |
| --- | --- | --- |
| Water | 5,145.6 | 10.70 |
| Tetrasodium Pyrophosphate | 33.6 | 0.06 |
| Calcium Carbonate | 7,454.4 | 15.60 |
| Titanium Dioxide Slurry | 2,605.0 | 5.40 |
| Cedar Fragrance P-0053 | 4,800.0 | 10.0 |
| 50% Colloid 60 Solution | 19.2 | 0.04 |
| | 20,057.8 | 41.80 |

The above represents part of the composition of the invention. The above blend is incorporated in the letdown latex composition as follows:

| LETDOWN | LBS. | % |
| --- | --- | --- |
| Undercoat Grind | 20,057.8 | 41.80 |
| Water | 184.0 | 17.10 |
| Geon Latex | 19,128.0 | 39.90 |
| 50% Acrysol G. S. Solution | 513.2 | 1.20 |
| | 47,883.0 | 100.0 |

Thus, the top and bottom of the substrate are coated with latex in separate steps. After the second top coating of the substrate, the substrate again is passed through an oven to dry the latex composition. The latex composition is bonded to the fibers of the substrate when the latex composition impregnates and/or coats (surrounds) the fibers of the substrate. The coated substrate is then collected, and may have a design printed thereon by conventional means.

While present embodiments of this invention, and methods of practicing the same have been illustrated and described, it will be recognized that this imvention may be otherwise variously embodied and practiced within the scope of the following claims.

What is claimed is:

1. In a wall covering comprising a polymeric exterior decorative surface layer and an inside surface of said wall covering, the improvement comprising a fragrant polymer entrapped emollient-moisturizer composition incorporated substantially uniformly in said polymeric layer, said fragrant emollient-moisturizer composition being gradually released into the atmosphere over an extended period of time.

2. The wall covering of claim 1 in which said polymeric layer is a vinyl layer which has about 5–12% by weight polymer entrapped emollient composition powder in dry blend incorporated therein.

3. The wall covering of claim 2 in which said fragrant emollient-moisturizer composition consists essentially of a member selected from the group consisting of cedar oil, baby powder, florals, leathers, fruits and sea mist.

4. The wall covering of claim 1 in which said polymeric layer has about 10% by weight polymer entrapped emollient powder incorporated therein.

5. The wall covering of claim 1 which is free of pinholes.

6. In a laminated wall covering comprising a polymeric exterior decorative surface layer and a substrate defining an inside surface of said wall covering, the improvement comprising a fragrant polymer entrapped emollient-moisturizer composition incorporated substantially uniformly in said polymeric layer, said fragrant emollient-moisturizer composition being gradually released into the atmosphere over an extended period of time.

7. The wall covering of claim 6 in which said substrate has a density of about 1½ ounces per square yard.

8. The wall covering of claim 6 in which said polymeric layer is a vinyl layer which has about 7–12% by weight polymer entrapped emollient powder in dry blend incorporated therein.

9. The wall covering of claim 8 in which said polymeric layer has about 10% by weight polymer entrapped emollient powder in dry blend incorporated therein.

10. The laminated wall covering of claim 8 in which said polymeric exterior surface has a substantially uniform thickness.

11. The laminated wall covering of claim 10 in which said polymeric exterior layer has a thickness of about 6 to 7 mils.

12. The laminated wall covering of claim 11 which is free of pinholes.

13. The wall covering of claim 6 in which said fragrant emollient-moisturizer composition consists essentially of cedar oil.

14. The wall covering of claim 6 in which said fragrant emollient-moisturizer composition consists essentially of baby powder.

15. The wall covering of claim 6 in which said fragrant emollient-moisturizer composition consists essentially of lilac oil.

16. The wall covering of claim 6 in which said fragrant emollient-moisturizer composition consists essentially of rose oil.

17. In a wall covering comprising a substrate, a polymeric exterior decorative surface and an exposed polymeric surface defining an inside surface of said wall covering, the improvement comprising a fragrant polymer entrapped emollient-moisturizer composition incorporated substantially uniformly in said polymeric layer, said fragrant emollient-moisturizer composition being gradually released into the atmosphere over an extended period of time.

18. The wall covering of claim 17 in which said polymeric surfaces comprise polyvinylchloride latex which has about 5–12% by weight polymer entrapped emollient composition powder in dry blend incorporated therein.

19. The wall covering of claim 17 in which said fragrant emollient-moisturizer composition consists essentially of a member selected from the group consisting of cedar oil, baby powder, florals, leathers, fruits and sea mist.

20. In a method of making a decorative laminated wall covering comprising the steps of formulating a polymeric composition for an exterior decorative surface layer, forming said polymeric composition into a layer, and laminating said polymeric exterior decorative surface layer to a substrate, and printing a decorative design on said exterior surface layer, the improvement comprising the steps of incorporating a fragrant polymer entrapped emollient-moisturizer composition in said polymeric composition, and said forming step comprises extruding said polymeric composition to form said layer.

21. The method of claim 20 in which said incorporating step further comprises mixing about 5 to 12% by weight of said polymer entrapped emollient-moisturizer composition with said polymeric composition.

22. The method of claim 20 in which said extruding step further comprises hot melt extruding said polymeric composition.

23. The method of claim 22 in which said extruding step further comprises disposing an extruder head in spaced relation above calendering rollers to use gravity to partially spread and stretch said extruded polymer as it exits said extruder.

24. The method of claim 23 which further comprises measuring the density of said material as it is being extruded, feeding data obtained by measuring the density of said material into a computer, and controlling the speed of said calendering rollers and/or the tightness of the orifice of said extruder head using said computer based on the data fed into said computer according to a predetermined formula which is programmed on said computer, thereby providing a more uniform thickness in said wall covering.

25. The method of claim 20 in which the printing step further comprises printing a pattern on said exterior surface layer that complements the odor of said polymer entrapped emollient.

26. The method of claim 25 which further comprises printing a cedar board pattern on wall covering having a polymer entrapped cedar oil emollient.

27. In a method of extruding and calendering a layer of polymeric material having a substantially uniform thickness comprising the steps of, formulating said polymeric material for extrusion, feeding said polymeric material into a screw-type extruder, and extruding, calendering and collecting said extruded material; the improvement comprising the steps of disposing an extruder head in spaced relation sufficiently above calendering rollers to use gravity to partially spread and stretch said polymer as it exits said extruder head, measuring the density of said extruded material as it is being extruded, feeding data obtained by measuring the density of said extruded material into a computer, and controlling the speed of said calendering rollers and/or the tightness of the orifice of the extruder head by using a computer based on the data fed into the computer according to a predetermined formula which is programmed on the computer, thereby providing a more uniform thickness in said layer of polymeric material.

* * * * *

UNITED STATES PATENT AND TRADEMARK OFFICE
CERTIFICATE OF CORRECTION

PATENT NO. : 4,555,438

DATED : November 26, 1985

INVENTOR(S) : John E. Orsak and Charles A. Roman

It is certified that error appears in the above-identified patent and that said Letters Patent is hereby corrected as shown below:

On the face of the patent, delete "Dayco Corporation, Dayton, Ohio" and insert --L.E. Carpenter and Company, Wharton, New Jersey--.

Signed and Sealed this

Tenth Day of February, 1987

*Attest:*

DONALD J. QUIGG

*Attesting Officer*    *Commissioner of Patents and Trademarks*